United States Patent [19]

Owen

[11] 4,165,125

[45] Aug. 21, 1979

[54] SLIPOVER HEADREST PILLOW ASSEMBLY

[75] Inventor: Hugh J. Owen, Mansfield, Ohio

[73] Assignee: National Seating Company, Mansfield, Ohio

[21] Appl. No.: 931,900

[22] Filed: Aug. 8, 1978

Related U.S. Application Data

[63] Continuation-in-part of Ser. No. 805,590, Jun. 8, 1977, abandoned.

[51] Int. Cl.² ............................................. A61G 15/00
[52] U.S. Cl. ....................................... 297/220; 5/434; 5/485; 5/490
[58] Field of Search ................... 5/325, 326, 337–339; 297/191, 220, 396, 397

[56] References Cited

U.S. PATENT DOCUMENTS

| | | | |
|---|---|---|---|
| 372,763 | 11/1887 | Poitevent | 5/337 |
| 2,703,426 | 3/1955 | Barkl | 297/191 X |
| 3,974,531 | 8/1976 | Van Pelt | 5/339 |

Primary Examiner—James C. Mitchell
Attorney, Agent, or Firm—Maky, Renner, Otto & Boisselle

[57] ABSTRACT

A slipover headrest pillow assembly includes an invaginable open bottom cover having a pocket along the front side thereof, with such pocket initially being exposed for insertion of a foam pillow. The cover is then invaginated to enclose the pillow and to form a support compartment between such pillow pocket and the top and back walls of the cover, such support compartment receiving the top of the seat back when the cover has been slipped over the same to support such pillow assembly in a headrest position. The pocket may include a flap initially hanging freely downwardly to permit the pillow to be inserted in the pocket during assembly and then extending up and over the seat back within the support compartment after installation to enclose the pillow within the pocket.

10 Claims, 5 Drawing Figures

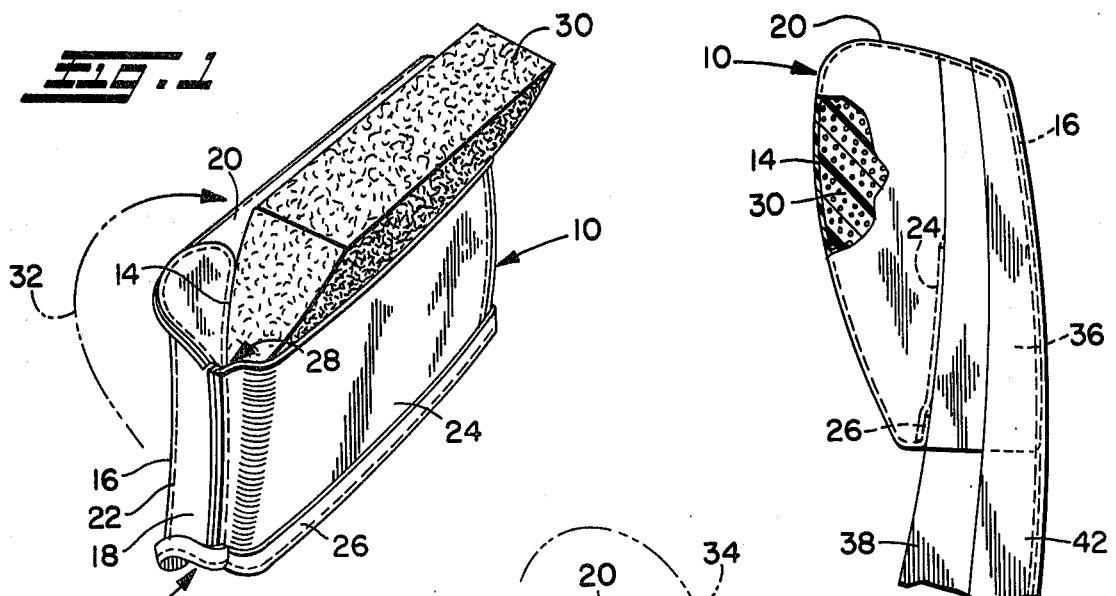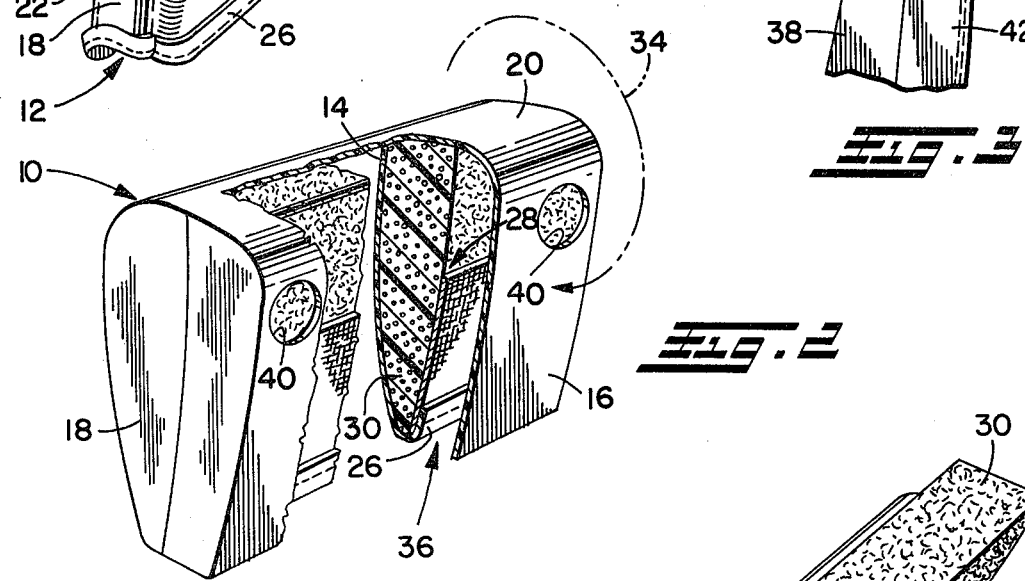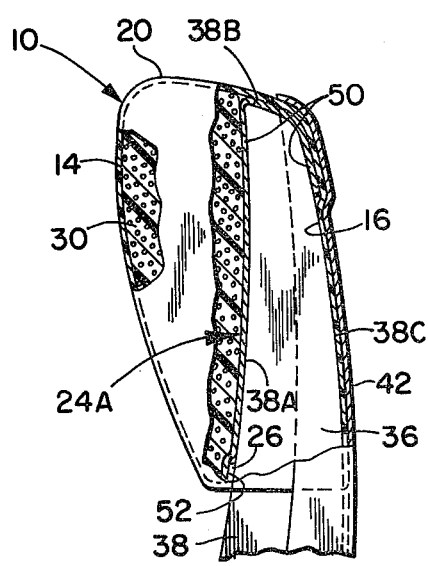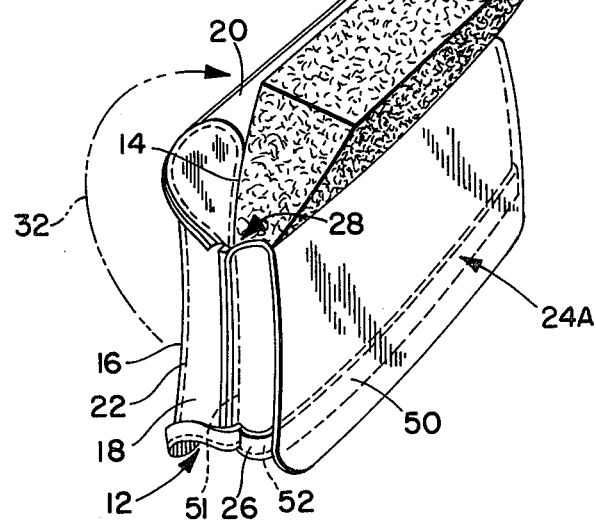

SLIPOVER HEADREST PILLOW ASSEMBLY

CROSS REFERENCE TO RELATED APPLICATION

This application is a continuation-in-part of Application Ser. No. 805,590, filed June 8, 1977.

BACKGROUND AND SUMMARY OF THE INVENTION

The present invention relates as indicated to slipover headrest pillows in general and to an easily assembled and installed slipover headrest pillow assembly in particular.

Seats for passenger vehicles, such as buses, trains and planes, are often provided with pillows or additional padding at the top of the seat back to permit the occupant to rest his head against the same. Such headrest pillows, which are particularly advantageous for the comfort of long distance passengers on intercity buses or the like, have been assembled and installed in several ways.

Specifically, a separate pillow structure may be built and attached to the seat back by fasteners. With such structure, a large open top bag with a downwardly extending attachment flap thereon is initially provided to receive a pillow insert. After the pillow is received, the top sides of the bag are secured together by stitching to form an upwardly extending attachment flap and to retain the pillow in the bag. The thus assembled pillow is then secured to the seat by folding the top and bottom attachment flaps into position to be releasably secured to the top of the seat back by a suitable fastening means. A back panel is then secured to the seat back to cover the top fasteners and top attachment flap to provide an aesthetically clean appearance and to preclude unauthorized access to such fasteners.

The above-described conventional headrest pillow has several disadvantages from assembly and maintenance standpoints. Specifically, the assembly is relatively slow and expensive because of the necessity for stitching the bag together after insertion of the pillow to enclose the same and to form the upwardly extending attachment flap. From a maintenance standpoint, the removal of the overall pillow assembly from the seat back requires release of both the back panel and attachment flap fasteners, while the replacement of the pillow insert itself further requires the stitching on the bag sides to be ripped out, a new pillow to be inserted, and the bag sides to be resewn. Although this particular headrest pillow form is not shown in the patented art, analogous headrest pillow support frames secured to the seat by pockets (De Montfort U.S. Pat. No. 3,073,649), by straps (Kailenta U.S. Pat. No. 2,557,874 and Earl U.S. Pat. No. 3,578,383) and by wrap-around fabric panels (Vogler U.S. Pat. No. 3,867,266) are disclosed in the parenthetically noted patents.

The above described bag was improved by increasing the width of the top opening and stitching the top attachment flap to preform an intermediate pillow compartment. This permitted all of the stitching to be done at one time, and the pillow subsequently to be inserted through the relatively wide opening and attachment flap into the pillow compartment. The thus formed pillow was then installed on the seat back at the top by screws passing through a metal strap, the top attachment flap and the back panel and at the bottom by hog rings connecting the bottom flap to a connecting strip sewn to the seat back.

Although the improved separate pillow form decreased assembly time, it was still relatively difficult to insert the pillow through the top opening and flap into the performed pillow compartment. Moreover, maintenance on the pillow required relatively time consuming removal of the fasteners and hog rings and then reconnection of the same upon pillow replacement. In both bag forms, the pillow could be removed without authorization by cutting the top and bottom attachment flaps.

Alternatively, another headrest pillow form consisting of an integrally molded seat back core having a headrest pillow formed thereon has been used. Such core is subsequently covered by an upholstered seat back cover assembly, a headcap assembly and a back panel. Such headcap assembly basically consists of an open bottom, box-like cover slipped over the top of the seat back assembly with such headcap subsequently being secured to the seat back by the back panel member embracingly enclosing the same.

The integrally molded seat back core is relatively expensive to purchase, and if the headrest portion wears out, the entire core must be replaced. Moreover, such integrally molded core is relatively hard and does not provide the comfort to the passenger of a separate headrest pillow.

The principal object of the present invention is to overcome such disadvantages in the prior art by providing a headrest pillow that is easily assembled, installed, and replaced while providing a relatively soft head support.

It is another object of the present invention to provide a headrest pillow assembly formed by an invaginable cover having a pocket thereon, with such pocket initially being exposed for insertion of a pillow and then being enclosed within the cover by invagination. By invaginating the cover, the easily installed pillow is fully securely enclosed, and the overall assembly is easily mounted to the seat by such cover forming a support compartment after invagination. Although the concept of turning covers inside out to encase a wedge shape sleeping pillow is shown in Emery U.S. Pat. No. 3,389,411, such patent does not relate to an invaginable pocketed cover for pillow reception and support functions to provide the above recited advantages.

It is still another object of the present invention to provide a headrest pillow assembly having an invaginable cover including a pillow reception pocket with a flap thereon that doesn't interfere with assembly and installation but protects the pillow in use from dirt, wear, and tampering. Such pocket and flap may be formed by sewing a single fabric piece to the proper cover edges along one end and part of the opposed sides thereof, thereby to form a pocket within the sewn edges and to form a flap from the freely hanging, unsewn portion of the fabric piece. Such flap permits the pillow to be inserted into the pocket and the cover then invaginated and installed without obstruction, with the flap in the installed position extending over and conforming to the seat back to cover and enclose the pillow.

To the accomplishment of the foregoing and related ends, the invention, then, comprises the features hereinafter fully described in the specification and particularly pointed out in the claims, the following description and the annexed drawing setting forth in detail certain illustrative embodiments of the invention, these being indicative, however, of but one of the various ways in which the principles of the invention may be employed.

BRIEF DESCRIPTION OF THE DRAWINGS

FIG. 1 is a perspective view of the cover and inserted pillow in their initial positional relationship with the arrow indicating the subsequent invagination of the same;

FIG. 2 is a broken away perspective in section of the pillow assembly after invagination of the cover;

FIG. 3 is a partially broken away side elevation of the headrest pillow assembly installed on a seat back;

FIG. 4 is a perspective view similar to FIG. 1 showing a second embodiment of the headrest pillow assembly in which the pocket has a protective flap thereon; and FIG. 5 is a partially broken away side elevation of the headrest pillow assembly of FIG. 4 installed on a seat back with the protective flap extending up, over and behind the seat back within the assembly support compartment to enclose and protect the pillow.

DESCRIPTION OF THE PREFERRED EMBODIMENT

Referring now in more detail to the drawing and initially to FIG. 1, the headrest pillow assembly includes an invaginable cover indicated generally at 10. Such cover is generally box-like in construction with an open bottom 12 and includes front wall 14, back wall 16, end walls 18 and top wall 20. The front, back and top walls 14, 16 and 20, respectively, are formed from one piece of soft vinyl material or the like which is stitched along its lateral sides to the end walls 18 as indicated at 22. A piece of muslin fabric 24 is positioned adjacent the front wall 14 of the cover and held in place by stitching to the side wall seams and to the bottom cuff 26 of the front wall to form an open top pocket indicated generally at 28. As shown in FIG. 1, the muslin pocket 28 is initially exposed on the outside of invaginable cover 10.

The headrest pillow assembly also includes a foam pillow insert 30 preferably of slightly rounded wedge shape configuration as best shown in FIGS. 2 and 3. Such foam pillow insert 30 is received in the muslin pocket 28 while the same is exposed. By initially exposing such pocket 28, the placement of the pillow insert into such pocket is facilitated.

After the pillow insert 30 has been received in pocket 28, the entire cover 10 is invaginated or turned right side out, as schematically indicated by arrows 32, 34, to enclose the pillow within the cover and to form a support compartment. As shown more clearly in FIG. 2, such invagination of the cover results in the foam pillow insert 30 being contained in the pocket 28 and within the cover 10 adjacent the front and top walls 14 and 20 of the latter. In such position, a support compartment 36 is defined within the cover between the pillow pocket 28, the end walls 18, the back wall 16, and the rear portion of top wall 20.

As shown in FIG. 3, the thus completed headrest pillow assembly can be slipped over the top of the seat back 38, with the support compartment receiving the top of such seat back. The support compartment 36 is dimensioned to fit relatively snugly with and conform to such seat back to provide stability, with the top wall thereof bearing against the top of the seat back to maintain the vertical position of the pillow assembly. As thus used in combination with the seat back, the headrest pillow assembly is located at a position approximating the back of the head for the seat occupant to permit such seat occupant to rest his head against such pillow.

The above described construction of the pillow assembly permits easy installation of the pillow into the cover and easy installation of the pillow assembly on the seat back without specialized mounting equipment or tools. The back wall 26 of the cover may be provided with holes 40 to permit clip retention means mounted on the seat back to pass therethrough after the cover has been slipped over the same. The back panel 42 for the seat may then be positioned over the seat back and secured thereto by the spring clips carried thereby being inserted in the seat back retention means therefor. This assembly permits the headrest pillow to be secured to the seat without mounting tools and results in a portion of the cover being enclosed within the back panel to reduce vandalism and to improve the aesthetic appearance.

If the pillow insert or cover becomes worn, the assembly may be removed by withdrawing the back panel and slipping the cover off the seat back. The cover may then be invaginated to expose the pillow for removal and replacement. Alternatively, if the cover is worn, the pillow may then be reused with a new cover.

Turning now to FIGS. 4 and 5, another embodiment of the headrest pillow assembly of the present invention is illustrated in which structural elements common to the first embodiment have been identified by the same reference numerals. Such second embodiment is substantially the same in construction, assembly and installation as the first embodiment except for the provision of a protective flap 50.

Such flap 50 and the pocket 28 are formed by a single, elongated piece 24A of muslin or like fabric being sewn to the side wall seams along a limited extent of the sides 51 of the fabric piece and to the bottom cuff 26 along the end 52 of the fabric piece. The sewn portion of the fabric piece in cooperation with the front wall 14 of the cover forms the pocket 28, while the remaining unsewn portion of the fabric piece 24A forms a flap 50 freely extending downwardly therefrom before assembly and installation. As is apparent from FIG. 4, flap 50 does not interfere with the pillow 30 being inserted into the pocket 28 or with the subsequent invagination of the cover.

After invagination, flap 50 hangs freely in the support compartment 36 until the slipover headrest assembly is installed on the top of the seat back 38. To accomplish installation, the headrest assembly is slipped over the top of the seat back 38, with the support compartment 36 snugly receiving the top of such seat back.

During such relative installation movement, the flap 50 conforms to the configuration of the seat back top by extending along the front (38A), top (38B), and back (38C) of the same in generally U-shape form as shown in FIG. 5. By extending along the seat back front 38A, the flap 50 effectively encloses and conceals the pillow insert 30 to minimize dirt contacting the pillow insert and to reduce wear on the pillow insert 30. Moreover, the U-shape of the installed flap 50 inside the cover increases the difficulty of obtaining access to the pillow insert for unauthorized removal of the same during use periods.

As in the first embodiment, a back panel 42 may be connected to the seat back further to enclose the pillow assembly for aesthetic and part retention purposes. The cover assembly with flap and the pillow insert used therein are individually and/or collectively replaceable and are interchangeable with the cover and pillow insert of the first embodiment.

Other modes of applying the principle of the invention may be employed, change being made as regards the details described, provided the features stated in any of the following claims or the equivalent of such be employed.

The embodiments of the invention in which an exclusive property or privilege is claimed are defined as follows:

1. In combination with a seat back, a slipover headrest pillow assembly comprising an invaginable, open bottom box-like cover having front, back, top and end walls relative to said seat back, a pillow insert, pocket means along the front wall of said cover having two positions, the first position being exposed on the outside of said cover to facilitate receipt of said pillow insert in said pocket, the second position being inside said cover after said pillow insert has been received and after the cover has been invaginated, and a support compartment formed by the cover between the pillow pocket, top, back and end walls of said cover after invagination, such compartment receiving the top of said seat back when the cover is slipped thereover to support such pillow assembly in a headrest position.

2. The slipover headrest pillow assembly set forth in claim 1 wherein the back wall of the cover has apertures therein to permit fasteners for a seat back panel to pass therethrough.

3. The slipover headrest pillow assembly set forth in claim 1 wherein said pocket means includes flap means integral therewith and initially freely hanging therefrom, said flap means extending up, over and behind the top of the seat back within the support compartment when the latter receives said seat back top, thereby to enclose substantially all of the pillow insert within said pocked means.

4. The slipover headrest pillow assembly of claim 3 wherein said pocket means includes an elongated fabric piece sewn along one end and a portion of its two sides to one surface of the front wall of the cover, the fabric piece where sewn cooperating with said front wall to form a pocket and where unsewn forming said flap means.

5. In combination with a seat back, a slipover headrest pillow assembly comprising an invaginable, open bottom box-like cover having front, back, top and end walls relative to said seat back, a pillow insert, pocket means along the front wall of said cover having two positions, the first position being exposed on the outside of said cover to facilitate receipt of said pillow insert in said pocket, the second position being inside said cover after said pillow insert has been received and after the cover has been invaginated, said pocket means including a flap connected thereto and initially extending freely outwardly therefrom, and a support compartment formed by the cover between the pillow pocket, top, back and end walls of said cover after invagination, such compartment receiving the top of said seat back when the cover is slipped thereover to support such pillow assembly in a headrest position with said flap inside said support compartment conforming to the top of the seat back by extending up, over and behind the same to enclose the pillow insert to minimize dirt accumulation on, wear to and unauthorized access to the pillow insert.

6. A method of assembling a slipover headrest pillow for a seat back comprising the steps of inserting a pillow into an exposed pocket means secured on a wall of an open bottom, box-like cover and invaginating the cover to enclose the pillow insert and to form a support compartment between the enclosed pillow insert and adjacent portions of the invaginated cover.

7. The method of claim 6 comprising the additional steps of sewing an elongated fabric piece to the cover and forming said pocket and a flap by stitching one end and portions of the two sides of said fabric piece to said cover, with the stitched portion of the fabric piece forming said pocket in cooperation with said cover and the unstitched portion of said fabric piece forming said flap.

8. The method of claim 7 further comprising the step of slipping the cover over the seat back with the support compartment receiving such seat back to mount the pillow in a headrest position, with said flap being positioned in said support compartment and extending up, over and behind the top of said seat fully to enclose said pillow insert.

9. The method of claim 6 further comprising the step of slipping the cover over the seat back with the support compartment receiving such seat back to mount the pillow in a headrest position.

10. The method of claim 9 further comprising the step of installing a back panel on the seat back to enclose a portion of the cover.

* * * * *